United States Patent
Termin et al.

[15] 3,679,724
[45] July 25, 1972

[54] DIALKALI SALTS OF ORTHOSILICIC ACID DIESTERS AND THEIR PREPARATION

[72] Inventors: Erich Termin, Laufenburg; Walter Rogler, Bonn; Wilhelm Joch, Niederkassel; Rudiger Honigschmid-Groscich, Ranzel, all of Germany

[73] Assignee: Dynamit Nobel AG, Froisdorf, Germany

[22] Filed: Oct. 27, 1970

[21] Appl. No.: 84,461

[30] Foreign Application Priority Data

Oct. 31, 1969 Germany ..................P 19 54 830.2
Sept. 30, 1970 Germany ..................P 20 48 018.6

[52] U.S. Cl. ...................................260/448.8, 260/448.8 A
[51] Int. Cl. ..............................................................C07f 7/04
[58] Field of Search ......................260/448.8 A, 448.8 R

[56] References Cited

UNITED STATES PATENTS

| | | | |
|---|---|---|---|
| 3,337,497 | 8/1967 | Bostick | 260/448.8 R |
| 3,208,972 | 9/1965 | Lyons | 260/448.8 R |
| 3,105,086 | 9/1963 | Ryan | 260/448.8 R |
| 2,587,636 | 3/1952 | MacMullen | 260/448.8 R |

*Primary Examiner*—Tobias E. Levow
*Assistant Examiner*—Werten F. W. Bellamy
*Attorney*—Burgess, Dinklage & Sprung

[57] ABSTRACT

Dialkali salts of orthosilicic acid diesters, e.g. disodium orthosilicic acid dimethyl ester, are obtained by reaction of an alkali hydroxide with an orthosilicic acid tetraester. The dialkali salts of orthosilicic acid diesters are useful products for surface treatment of glass plates or glass fibers by tackling or etching.

5 Claims, No Drawings

DIALKALI SALTS OF ORTHOSILICIC ACID DIESTERS AND THEIR PREPARATION

The present invention relates to novel ester salts of orthosilicic acid and to a process for their preparation.

In accordance with the invention dialkali salts of orthosilicic acid diesters are prepared by the reaction of tetraesters of orthosilicic acid with alkali hydroxides. Preferably the reaction involves alkali metal hydroxides and tetraalkyl esters of orthosilicic acid, advantageously wherein the alkyl groups have one to four carbon atoms; the products can be understood as being organo-oxosilanolates or as dialkali dialkoxy orthosilicates.

The compounds are salt-like and have crystalline X-ray patterns with well-defined plane spacing. The compounds are stable up to about 200° to 250° C. and above this temperature the alkoxide groups of the ester split off as the corresponding ethers or olefins and alcohol, confirming the presence of alkoxy groups in the compounds.

The compounds of the invention are hydroscopic and hydrolyze to silicates with the evolution of alcohol. The salts are highly soluble in the alcohol corresponding to their alkoxy groups.

The reaction proceeds according to the equation:

$$2\text{MeOH} + \text{Si(OR)}_4 \rightarrow (\text{MeO})_2\text{Si(OR)}_2 + 2\text{ROH}.$$

wherein
Me is preferably an alkali metal, and
R is preferably an alkyl radical of one to four carbon atoms, both alkyl radicals preferably being the same.

A number of different procedures can be used for effecting the reaction.

In one procedure, a several-fold to ten-fold excess of the orthosilicic acid ester is taken as the starting material and the alkali metal hydroxide is added either in solid form or in alcoholic solution.

The reaction starts up at room temperature and heats the mixture exothermically, although additional heat input may be required. Pressure and temperature are maintained such that first the alcohol and then the excess of the ester drawn off. In general the procedure is performed at temperatures between the boiling temperature of the pure alcohol and about 200° C. and at pressures of 1 to 760 mm Hg.

The alkali hydroxide is thoroughly dried and the ester is used in highly pure state, moisture being excluded.

In order to maintain the speed of the reaction until the reaction has gone to completion, it is advantageous continuously to distill off the alcohol formed in the reaction, which simultaneously provides a means of monitoring the reaction.

After the reaction is complete, careful evaporation of the excess alcohol and ester yields free-flowing white powders which, from their analyses, are the alkali salts of the trialkyl silicic acid, having the general formula $\text{MeO Si (OR)}_3$.

From these intermediates the dialkali salts of the orthosilicic acid dialkyl esters, $(\text{MeO})_2\text{Si(OR)}_2$, are obtained by treatment with heat or by extraction with solvents. The heat treatment is generally performed at 1 to 20 mm Hg. and at an elevated temperature from about 150° to 230° C., with stirring and continuous removal of $\text{Si(OR)}_4$ by suction filtering or distillation.

The dialkali salts can also be obtained by combining the ortho ester and alkali hydroxide starting products in a molar ratio of 1 : 2, i.e., 2 moles of alkali hydroxide in alcoholic solution or solid form are added to 1 mole of the ortho ester.

The procedure is especially advantageous in the preparation of the alkali salts of the silicon esters of alkanols of two to four carbon atoms because only the lower boiling alcohols have to be evaporated in order to purify them as shown in Examples 4 to 9 hereinbelow.

Another method of preparation consists in adding the orthoester, plain or dissolved, to an alcoholic solution of the alkali hydroxide (Example 10 hereinbelow). The yield of the dialkali salts is virtually quantitative based on the alkali hydroxide input.

The invention will be illustrated in the following examples wherein, unless otherwise specified, all parts and percentages are by weight.

EXAMPLE 1a

One thousand g of $\text{Si(OCH}_3\text{)}_4$ were put into a reaction vessel and then 60 g of NaOH (dried at 500° C.) were added. The formation of a salt began immediately in an exothermic reaction, with the formation of methanol. With further heating the methanol that formed was continuously distilled from the mixture. After about 30 minutes the reaction had ended; the boiling temperature remained constant at 121° C. corresponding to that of pure $\text{Si(OCH}_3\text{)}_4$.

The salt that had formed was contained in the ester largely in the form of a suspension. The excess ester was then distilled off and the salt residue was dried at 60° C. and 20 mmHg to a free-flowing, white, odorless powder. Two hundred and thirty-six g of the salt residue and 834 g of distillate were obtained from the reaction, 94.2 percent of the distillate consisting of $\text{Si(OCH}_3\text{)}_4$ and 5.8 percent consisting of methanol.

The salt residue obtained as intermediate corresponded in analysis to the monosodium salt of orthosilicic acid trimethyl ester.

EXAMPLE 1b

Two hundred g of the salt product of 1a was further heated at 20 mm Hg and when the temperature reached 155° C. $\text{Si(OCH}_3\text{)}_4$ was distilled off, this continuing during the further heating of the salt to 230° C. At 230° C./20 mm Hg there remains a crystalline, white salt which, on the basis of quantitative and qualitative analysis, corresponds to the disodium salt of orthosilicic acid dimethyl ester.

The distillate (93.5 g) consisted of 100% $\text{Si(OCH}_3\text{)}_4$. The salt residue obtained (106 g) gave the following analysis:
27.2% sodium
16.6% silicon
34.9% $\text{OCH}_3$
14.8% C
3.8% $\text{H}_2$ These values are in good agreement with the theoretical values for the compound $(\text{NaO})_2\text{Si(OCH}_3\text{)}_2$.

The density of the compound in petroleum amounts to 1.374 g/ml. The residue on ignition was 76.5 wt-% at 550° C. and 73.8 wt-% at 800° C.

The substance is soluble in lower alcohols, especially methanol, but insoluble in most other solvents.

The presence of moisture results in hydrolysis.

X-ray study showed lattice plane spacings of 3.35 A, 6.31 A and 12.36 A.

Upon further heating of the prepared salt to temperatures above 230° C. at 20 mm Hg, dimethyl ether is given off, which is attributed to a condensation between methoxy groups with the formation of Si—O—Si bonds.

EXAMPLE 1c

The salt residue of Example 1a was exhaustively extracted with carbon tetrachloride at 80° C. In this manner a salt was obtained having the same analytical values and characteristics as the one in Example 1b.

In a manner analogous to Examples 1a to 1c, $\text{Si(OC}_2\text{H}_5\text{)}_4$ can be reacted with NaOH or KOH.

EXAMPLE 2a

One thousand g $\text{Si(OCH}_3\text{)}_4$ were put into a reaction vessel and 80 g of KOH, dried at 500° C. were added. The reaction proceeded as in Example 1a. There were obtained 243 g of a salt residue comprising a white free-flowing powder, and 836 g of a distillate which consisted of 94.5% $\text{Si(OCH}_3\text{)}_4$ and 5.4% methanol.

The salt residue had the following analysis:
23.1% potassium
15.4% silicon 49.5% OCH$_3$
19.1% C
4.9% H$_2$

EXAMPLE 2b

Two hundred g of the salt prepared under 2a were heated at 20 mm Hg and 230° C. As in Example 1b, the distillation of Si(OCH$_3$)$_4$ left a crystalline, white salt which, according to qualitative and quantitative analysis, corresponds to the dipotassium salt of orthosilicic acid dimethyl ester. Analysis:
39.6% potassium
14.3% silicon
30.1% OCH$_3$
11.6% C
3.1% H$_2$ These percentages are in agreement with the formula (KO)$_2$Si(OCH$_3$)$_2$.

The density of the compound in petroleum at 20° C. is 1.473 g/ml. The ignition residue was determined to be 75.1 wt-% at 550° C. and 71.2 wt-% at 800° C.

X-ray examination showed lattice plane spacings of 3.35 A, 5.48 A and 10.26 A. Like the disodium salt, the dipotassium salt of orthosilicic acid dimethyl ester yields dimethyl ether when heated above 230° C. at 20 mm Hg, which is to be attributed to the condensation of OCH$_3$ groups.

EXAMPLE 2c

The salt residue of Example 2a was dissolved by the steady addition of methanol at the boiling point, and Si(OCH$_3$)$_4$ was removed by the steady distillation of the methanol. As soon as no more Si(OCH$_3$)$_4$ occurred in the distillate, the remainder of the methanol was evaporated away. The residue had the precise composition of the compound (KO)$_2$Si(OCH$_3$)$_2$ and the same characteristics as above.

EXAMPLE 3

Analogously to Example 1a and 2a, dried LiOH was reacted with Si(OCH$_3$)$_4$. The volume-time yield of the reaction of Si(OCH$_3$)$_4$ with LiOH amounts to approximately one one-hundredth that with NaOH or KOH as in Examples 1a and 2a, respectively.

EXAMPLE 4

One Thousand g of Si(OC$_2$H$_5$)$_4$ were placed in a reaction vessel and successively a solution of 384 g NaOH (dehydrated at 500° C.) and 2,000 g of ethanol were added. During the addition of these substances the mixture was heated to boiling with refluxing. Thereafter the clear solution was heated for about 1 more hour, with refluxing, and then the ethanol was evaporated away and the salt residue, a white free-flowing powder, was dried at 150° C. and 1 mm Hg. The amount of ethanol removed by the evaporation was 2442 g, in which no more (Si(OC$_2$H$_5$)$_4$ could be detected; the salt residue amounted to 940 g and corresponded, as shown by the following analysis, to the disodium salt of orthosilicic acid diethyl ester of the formula (NaO)$_2$Si(OC$_2$H$_5$)$_2$:
23.3% sodium
14.1% silicon
45.5% OC$_2$H$_5$
24.5% C
5.1% H$_2$ The density of the compound in petroleum at 20° C. amounts to 1.37. The ignition residue was determined to be 63.7 wt-% at 550° C. and 61.7 wt-% at 800° C.

X-ray analysis showed lattice plane spacings of 2.08 A, 3.42 A and 15.30 A.

When the disodium salt of silicic acid diethyl ester is heated to above 210° C. at 10 mm Hg, ethylene, ethanol, methane and CO are given off, which is attributed to decomposition of the salt.

EXAMPLE 5

One thousand g of Si(OC$_2$H$_5$)$_4$ were reacted with 539 g of KOH dissolved in 3,300 g of ethanol in a procedure and under conditions analogous to Example 4, and then a salt residue was obtained from the clear reaction solution by evaporating the ethanol at 150° C. and 1 mm Hg. 3,743 g of ethanol were evaporated, in which no more Si(OC$_2$H$_5$)$_4$ could be detected. The salt residue, a white free-flowing powder, amounted to 1,093 g and, with the following analysis, corresponded to the dipotassium salt of orthosilicic acid diethyl ester (KO)$_2$Si(OC$_2$H$_5$)$_2$:
33.4% potassium
12.3% silicon
38.9% OC$_2$H$_5$
20.8% C
4.3% H$_2$ The density of the compound in petroleum at 20° C. amounts to 1.43. The ignition residue was determined to be 71.2 wt-% at 550° C. and 66.5 wt-% at 800° C. X-ray examination showed lattice plane spacings of 3.40 A and 13.32 A.

When the dipotassium salt of the silicic acid diethyl ester is heated to above 210° C. at 10 mm Hg, ethylene, ethanol, methane and CO are given off due to decomposition.

EXAMPLE 6

One thousand g of Si(OC$_3$H$_7$)$_4$ were placed in a reaction vessel and a solution of 303 g of NaOH in 2,100 g n-propanol was added in increments, with heating, over a period of about 30 minutes. After the adding of this solution, the clear solution was refluxed for about 1 hour, and then the propanol was evaporated and the salt residue was dried at 150° C. and 1 mm Hg.

2,550 g of n-propanol was obtained as distillate, in which Si(OC$_3$H$_7$)$_4$ could no longer be detected. The residue, a white free-flowing powder, amounted to 851 g and, with the following analysis, virtually corresponded to the disodium salt of orthosilicic acid dipropyl ester of the formula (NaO)$_2$Si(OC$_3$H$_7$)$_2$:
20.6% sodium
13.1% silicon
53.0% OC$_3$H$_7$
32.1% C
6.3% H$_2$ The density of this compound, measured in petroleum, at 20° C. amounted to 1.28. The ignition residue was determined to be 58.5 wt-% at 550° C. and 53.8 wt-% at 800° C. X-ray examination showed lattice plane spacings of 3.41 A and 16.28 A.

Heating of the disodium salt of the silicic acid dipropyl ester to temperatures above 200° C. yields propylene, propanol, methane and CO due to decomposition of the salt.

EXAMPLE 8

One thousand g of Si(OC$_4$H$_9$)$_4$ were placed in a reaction vessel and heated, and then a solution of 250 g of NaOH in 2,500 g of n-butanol was added. After the clear solution had been refluxed for about 1 hour, 2,960 g of C$_4$H$_9$OH in which Si(OC$_4$H$_9$)$_4$ could no longer be detected was drawn off while the solution was heated up to 160° C. at 1 mm Hg. Seven hundred and ninety g of a yellowish white free-flowing powder was obtained as the salt residue.

The analysis corresponds to the disodium salt of orthosilicic acid dibutyl ester (NaO)$_2$Si(OC$_4$H$_9$)$_2$:
17.9% sodium
11.1% silicon
58% OC$_4$H$_9$
38.2% C
7.2% H$_2$ The density of the compound measured in petroleum amounts to 1.14.

The ignition residue was determined to be 61.1 wt-% at 550° C. and 47.9 wt-% at 800° C.

X-ray examination showed lattice plane spacings of 3.40 A and 16.28 A.

When the disodium salt of the silicic acid dibutyl ester is heated to temperatures above 200° C., butanol, olefin, methane and CO are given off due to decomposition of the salt.

EXAMPLE 9

One thousand g of $Si(OC_4H_9)_4$ were reacted with 350 g of KOH dissolved in 3,500 g of $n-C_4H_9OH$ under experimental conditions analogous to those of Example 8.

After the reaction had ended, 3,960 g of n-butanol containing no more detectable $Si(OC_4H_9)_4$ was withdrawn when the solution was heated to 150° C. at 1 mm Hg. The salt residue was 890 g of a white free-flowing powder which, according to the following analysis, corresponded to the dipotassium salt of orthosilicic acid dibutyl ester $(KO)_2Si(OC_4H_9)_2$:

27.2% potassium
9.9% silicon
52.3% $OC_4H_9$
34.2% C
6.4% $H_2$

The density of the salt, measured in petroleum, amounts to 1.24.

The ignition residue was determined to be 60.7 wt-% at 550° C. and 53.8 wt-% at 800° C.

The X-ray examination showed lattice plane spacings of 3.42 A and 16.28 A.

When the dipotassium salt of the silicic acid dibutyl ester was heated to temperatures above 200° C., butanol, olefin, methane and CO were formed as a result of decomposition of the product.

EXAMPLE 10

Sixty g of NaOH (dehydrated at 500° C.) were dissolved in 300 g of $CH_3OH$ and the solution was refluxed. Upon the addition of $Si(OCH_3)_4$, a white precipitate settled out.

A total of 113 g of $Si(OCH_3)_4$ was added successively over a period of 3 hours, corresponding to a 2 : 1 molar ratio of NaOH : $Si(OCH_3)_4$. Then the suspension was filtered, the salt residue was washed with methanol and was dried at 150° C./1 mm Hg.

The composition of the residue (37 g) corresponded approximately to a sodium metasilicate, on the basis of the following analysis:

NA 32.5%
Si 20.8%
$OCH_3$ 0.94%

The filtrate was concentrated by evaporation, whereupon a salt residue (60g) was obtained which, when dried at 230° C./20 mm Hg, corresponded to the disodium salt of orthosilicic acid dimethyl ester $(NaO)_2Si(OCH_3)_2$:

27.9% sodium
16.6% silicon
35.1% $OCH_3$
14.9% C
3.8% $H_2$

The distillate consisted of 95.8% $CH_3OH$ and 4.2% $Si(OCH_3)_4$.

The novel dialkali salts of orthosilicic acid diesters of the invention are useful products for surface treatment of glass plates or glass fibers by tackling or etching.

What is claimed is:

1. Dialkali salts of orthosilicic acid lower alkyl diesters.

2. Esters according to claim 1, wherein Me is sodium or potassium and both R radicals are the same alkyl of one to four carbon atoms.

3. Process for the production of diesters according to claim 1 which comprises reacting an alkali hydroxide with an orthosilicic acid lower alkyl tetraester.

4. Process according to claim 3, wherein the alkali metal hydroxide is sodium or potassium hydroxide and the alkyl groups of the tetra-lower alkyl ortho-silicate are the same alkyl of one to four carbon atoms.

5. Process according to claim 4, wherein the reaction is carried out substantially under anhydrous conditions.

* * * * *

UNITED STATES PATENT OFFICE
CERTIFICATE OF CORRECTION

Patent No. 3,679,724            Dated July 25, 1972

Inventor(s) Erich Termin et al.

It is certified that error appears in the above-identified patent and that said Letters Patent are hereby corrected as shown below:

First Page, box [73], Assignee change "Froisdorf" to --Troisdorf

Col. 1, line 40, before ester, insert --can be--.

Col. 3, line 18, change the formula from "$(KO)_2Si(OCH_{32}$" to --$(KO)_2Si(OCH_3)_2$--.

Col. 3, line 57, change "$(Si(OC_2H_5)_4$" to --$Si(OC_2H_5)_4$--.

Col. 4, line 36, change "$Si(OC_3H_7b4$" to --$Si(OC_3H_7)_4$--.

Col. 4, line 61 change "$Si(OC_4H_9b4$" to --$Si(OC_4H_9)_4$--.

Col. 6, line 21, change "$Si(OCH_3)_{4b}$," to --$Si(OCH_3)_4$--.

Signed and sealed this 9th day of January 1973.

(SEAL)
Attest:

EDWARD M. FLETCHER, JR.            ROBERT GOTTSCHALK
Attesting Officer                       Commissioner of Patents